United States Patent [19]
Crooker

[11] Patent Number: 5,188,749
[45] Date of Patent: Feb. 23, 1993

[54] R22/R124/R142B REFRIGERANT BLENDS

[75] Inventor: Richard M. Crooker, Fogelsville, Pa.

[73] Assignee: Elf Atochem North America, Inc., Philadelphia, Pa.

[21] Appl. No.: 729,974

[22] Filed: Jul. 15, 1991

[51] Int. Cl.$^5$ .............................................. C09K 5/04
[52] U.S. Cl. .......................................... 252/67; 62/114
[58] Field of Search .......................... 252/67; 62/114

[56] References Cited

U.S. PATENT DOCUMENTS 4,303,536 12/1981 Orfeo et al. ........................... 252/67
4,810,403 3/1989 Bivens et al. ......................... 252/67

FOREIGN PATENT DOCUMENTS 0105831 4/1984 European Pat. Off.
3-168262 7/1991 Japan.

Primary Examiner—Christine Skane

[57] ABSTRACT

Refrigerant mixtures of the HCFCs monochlorodifluoromethane, 2-chloro-1,1,1,2-tetrafluoroethane, and 1-chloro-1,1-difluoroethane whose composition falls within the area of polygon KLTS of the FIGURE.

3 Claims, 1 Drawing Sheet

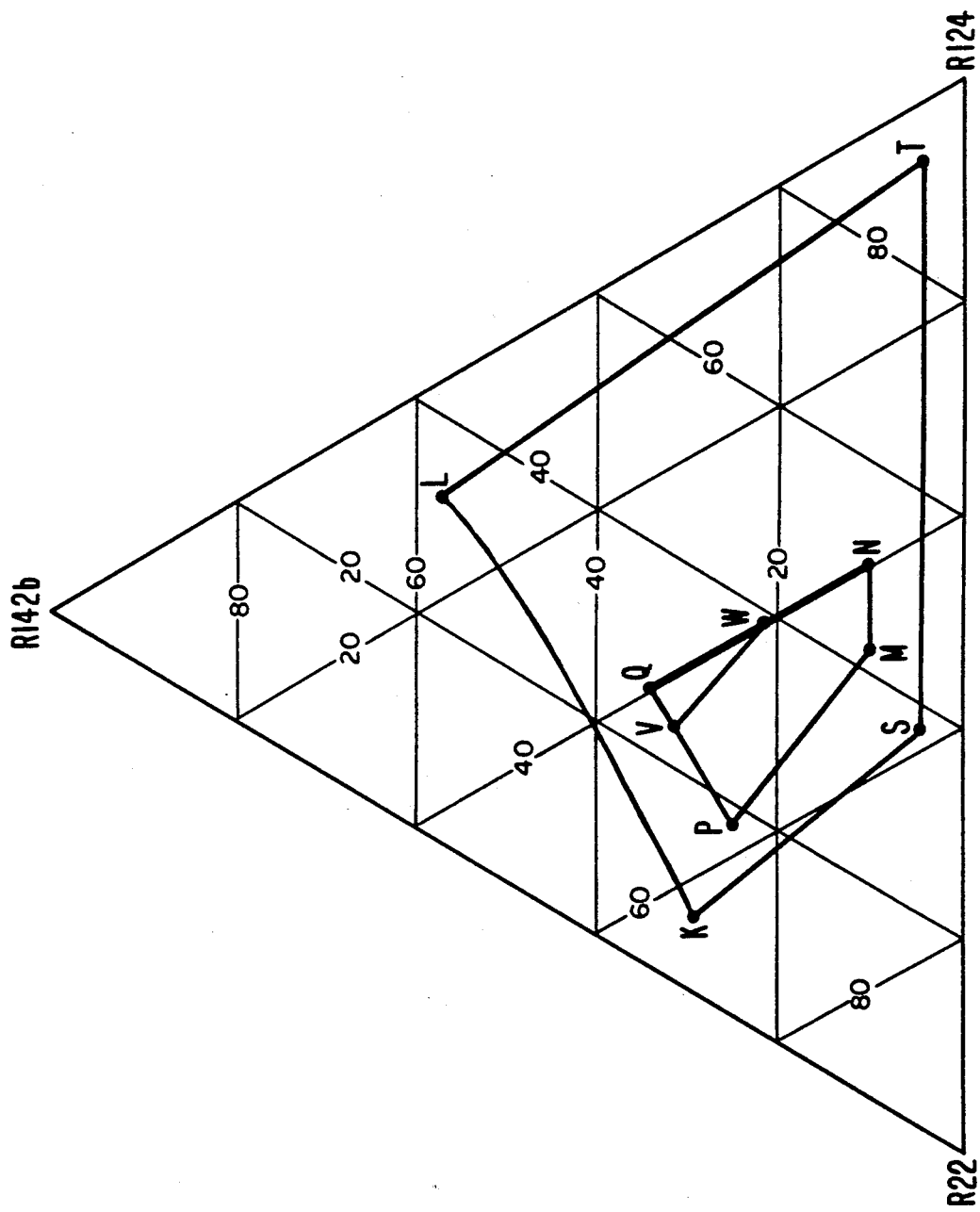

R22/R124/R142B REFRIGERANT BLENDS

FIELD OF THE INVENTION

This invention concerns refrigerant mixtures of the hydrochlorofluorocarbons ("HCFCs") monochlorodifluoromethane ("R22"), 2-chloro-1,1,1,2-tetrafluoroethane ("R124"), and 1-chloro-1,1-difluoroethane ("R142b"), which mixtures are particularly useful as a replacement for the chlorofluorocarbon ("CFC") dichlorodifluoromethane ("R12").

BACKGROUND OF THE INVENTION

R12 has been the refrigerant of choice for, for example, auto air conditioning and domestic refrigerators, but has been found to have unacceptably high ozone depletion potential ("ODP") and global warming potential ("GWP").

Several replacements have been proposed for R12, but all have been found wanting. For example, 1,1,1,2-tetrafluoroethane ("R134a") is more acceptable environmentally, but cannot be used in most existing equipment owing to incompatibility with common refrigeration oils. Blends of R22 and R142b have better oil solubility, but in the event of a prolonged leak from the vapor phase can become flammable owing to fractionation causing a shift to over about 70% R142b. A blend of R22 and R124 has also been proposed (U.S. Pat. No. 4,303,536), but does not offer the solubility and cost-effectiveness of the subject ternary blend.

What is needed is a refrigerant blend which offers a combination of high energy efficiency (as indicated by a high "COP" or coefficient of performance), good oil solubility, and low cost, while remaining essentially nonflammable throughout a leak. Such blends would be useful as replacements for R12 in auto air conditioning, domestic refrigerators, commercial refrigeration units, and the like.

SUMMARY OF THE INVENTION

A refrigerant mixture consisting essentially of R22, R124, and R142b is provided, the mixture having a composition falling within the area of a polygon KLTS defined by points, in weight percent based on the total weight of the mixture, K (64, 7, 29), L (10, 33, 57), T (5.5, 89.5, 5), and S (58, 37, 5) in the FIGURE.

BRIEF DESCRIPTION OF THE DRAWING

The FIGURE is a ternary diagram showing the region of the compositions of the present invention (in weight percent).

DETAILED DESCRIPTION OF THE INVENTION

It has now been unexpectedly found that R22/R124/R142b ternary blends falling within area KLTS of the FIGURE meet the foregoing objectives of efficiency, solubility, cost, and nonflammability. Lines KS and LT in the FIGURE represent outer compositional bounds because mixtures within these limits are calculated to have pressures within plus or minus 25% of the pressure of R12 over the temperature range of $-20°$ C. to $70°$ C. Compositions in the region below line KL are non-flammable (or essentially so) and remain so in the event of a leak from the vapor phase. At least 5% R142b is desired (represented by line ST) to enhance solubility of the blend since R142b is found to be more soluble than R22 or R124 in conventional oils such as alkyl benzene oils, to increase efficiency (COP increases in accordance with the amount of R142b present for a given amount of R22), and to lower the cost of the blend.

Preferred mixtures of this invention fall within the area of polygon PQNM defined by points P (57, 18, 25), Q (40, 26, 34), N (40, 50, 10), and M (47.5, 42.5, 10) in the FIGURE. The compositional limits are determined by a desire to maximize the COP (thus a content of at least 10% R142b as represented by line MN), to achieve a cooling capacity at least about equal to that of R12 (thus a content of at least 40% R22 as represented by line QN), to achieve a pressure in the condenser (which is the highest pressure in a refrigeration system) which is about equal to or less than 1.1 times that of R12 (achieved by mixtures in the region to the right of line PM), and to provide an added margin of nonflammability (by operating in the region below line PQ).

Most preferred are those blends having a condenser pressure about equal to that of R12 (achieved by blends in the area to the right of line VW) so that the most preferred embodiment is represented by compositions in the area of triangle VQW defined by points V (45.5, 23, 31.5), Q (40, 26, 34), and W (40, 38.5, 21.5) in the FIGURE.

The boiling points of R22, R124, and R142b, in degrees C., are $-40.75$, $-11.95$, and $-9.15$, respectively. Their saturated vapor pressures (at 20° C.) in psia are 132.1, 48.8, and 43.8, respectively.

Parameters calculated by the steady-state thermodynamic analysis for R12 and various R22/R124/R142b mixtures in a typical automobile air conditioner (with compressor, condenser, and evaporator) are reported in the Table below:

TABLE

| 22/124/142b Blend | COP | VCR[1] | Pressure in Condenser[2] |
|---|---|---|---|
| Standard[3] | 1.525 | 1422 | 1808 |
| 10/80/10 | 1.462 | 922 | 1424 |
| 10/40/50 | 1.562 | 906 | 1298 |
| 30/60/10 | 1.543 | 1265 | 1742 |
| 30/30/40 | 1.623 | 1204 | 1582 |
| 40/50/10 | 1.571 | 1437 | 1888 |
| 40/40/20 | 1.603 | 1407 | 1818 |
| 40/30/30 | 1.630 | 1378 | 1755 |
| 50/40/10 | 1.594 | 1606 | 2026 |
| 50/30/20 | 1.628 | 1567 | 1945 |
| 50/20/30 | 1.657 | 1529 | 1873 |
| 60/20/20 | 1.650 | 1722 | 2064 |
| 60/10/30 | 1.680 | 1675 | 1982 |

[1] VCR indicates cooling capacity in kilojoules/cubic meter
[2] Pressure in kilopascals
[3] The "standard" is R12.

What is claimed is:

1. A ternary refrigerant mixture consisting essentially of monochlorodifluoromethane, 2-chloro-1,1,1,2-tetrafluoroethane, and 1-chloro-1,1-difluoroethane, said mixture having a composition falling within the area of a polygon KLTS defined by points, in weight percent, K (64, 7, 29), L (10, 33, 57), T (5.5, 89.5, 5), and S (58, 37, 5) in the FIGURE.

2. The ternary refrigerant mixture of claim 1 wherein the composition falls within the area of a polygon PQNM defined by points P (57, 18, 25), Q (40, 26, 34), N (40, 50, 10), and M (47.5, 42.5, 10) in the FIGURE.

3. The ternary refrigerant mixture of claim 1 wherein the composition falls within the area of a triangle VQM defined by points V (45.5, 23, 31.5), Q (40, 26, 34), and W (40, 38.5, 21.5) in the FIGURE.

* * * * *